US009557859B2

(12) United States Patent
Bright et al.

(10) Patent No.: US 9,557,859 B2
(45) Date of Patent: Jan. 31, 2017

(54) METHOD OF MAKING TOUCH SENSITIVE DEVICE WITH MULTILAYER ELECTRODE AND UNDERLAYER

(75) Inventors: Clark I. Bright, Tucson, AZ (US); Nancy S. Lennhoff, North Andover, MA (US); Mark E. Flanzer, Wellesley, MA (US); Dennis M. Brunner, Centralia, MO (US)

(73) Assignee: 3M Innovative Properties Company, St. Paul, MN (US)

( * ) Notice: Subject to any disclaimer, the term of this patent is extended or adjusted under 35 U.S.C. 154(b) by 553 days.

(21) Appl. No.: 13/489,130

(22) Filed: Jun. 5, 2012

(65) Prior Publication Data

US 2012/0315383 A1    Dec. 13, 2012

Related U.S. Application Data

(60) Provisional application No. 61/495,214, filed on Jun. 9, 2011.

(51) Int. Cl.
*B05D 5/12* (2006.01)
*G06F 3/044* (2006.01)

(52) U.S. Cl.
CPC ..... *G06F 3/044* (2013.01); *G06F 2203/04103* (2013.01)

(58) Field of Classification Search
USPC .................................. 427/58, 108
See application file for complete search history.

(56) References Cited

U.S. PATENT DOCUMENTS

| | | | |
|---|---|---|---|
| 4,714,631 A * | 12/1987 | Aufderheide | 427/250 |
| 5,440,446 A | 8/1995 | Shaw | |
| 5,877,895 A | 3/1999 | Shaw | |
| 6,010,751 A * | 1/2000 | Shaw et al. | 427/255.7 |
| 6,819,316 B2 | 11/2004 | Schulz | |
| 7,019,734 B2 | 3/2006 | Cross | |
| 7,468,211 B2 | 12/2008 | McCormick | |
| 8,068,186 B2 | 11/2011 | Aufderheide | |
| 2001/0040733 A1 | 11/2001 | Toyoshima | |
| 2003/0124392 A1* | 7/2003 | Bright | 428/698 |
| 2003/0203101 A1 | 10/2003 | Haubrich et al. | |
| 2005/0083307 A1 | 4/2005 | Aufderheide | |
| 2005/0259208 A1* | 11/2005 | Miki et al. | 349/149 |
| 2006/0112987 A1* | 6/2006 | Nakata et al. | 136/256 |
| 2009/0066670 A1 | 3/2009 | Hotelling | |
| 2009/0316060 A1 | 12/2009 | Nirmal | |

(Continued)

OTHER PUBLICATIONS

International Search Report for PCT/US2012/040901, mailed on Dec. 26, 2012, 3 pp.

*Primary Examiner* — Brian K Talbot
(74) *Attorney, Agent, or Firm* — Robert S. Moshrefzadeh

(57) ABSTRACT

Method of making a touch sensor including one or more multilayer electrodes and an underlayer disposed on a substrate. The underlayer is disposed between the multilayer electrodes and the substrate. The multilayer electrodes including at least two transparent or semitransparent conductive layers separated by a transparent or semitransparent intervening layer. The intervening layer includes electrically conductive pathways between the first and second conductive layers to help reduce interfacial reflections occurring between particular layers in devices incorporating the conducting film or electrode.

13 Claims, 5 Drawing Sheets

(56) References Cited

U.S. PATENT DOCUMENTS

2010/0175749 A1* 7/2010 Tsutsumi et al. ............. 136/256
2011/0036391 A1  2/2011 McCormick
2011/0139516 A1  6/2011 Nirmal

* cited by examiner

METHOD OF MAKING TOUCH SENSITIVE DEVICE WITH MULTILAYER ELECTRODE AND UNDERLAYER

CROSS REFERENCE TO RELATED APPLICATIONS

This application claims the benefit of U.S. Provisional Patent Application No. 61/495,214, "Method of Making Touch Sensitive Device With Multilayer Electrode And Underlayer", filed Jun. 9, 2011, the disclosure of which is incorporated by reference herein in its entirety.

CROSS REFERENCE TO RELATED APPLICATIONS

This application is related to U.S. Patent Application No. 61/495,209, "Touch Sensitive Device With Multilayer Electrode and Underlayer," filed Jun. 9, 2011; U.S. patent application Ser. No. 10/686,141, "Patterned Conductor Touch Screen Having Improved Optics," filed Oct. 15, 2003; U.S. patent application Ser. No. 12/540,394, "Conducting Film or Electrode with Improved Optical and Electrical Performance for Display and Lighting Devices and Solar Cells," filed Aug. 13, 2009; and U.S. patent application Ser. No. 12/141,544, "Conducting Film or Electrode with Improved Optical and Electrical Performance," filed Jun. 18, 2008; and U.S. patent application Ser. No. 12/639,363, "Touch Sensitive Device with Multilayer Electrode Having Improved Optical and Electrical Performance," filed Dec. 16, 2009,

BACKGROUND

Touch screens offer a simple and intuitive way for users to interact with computing devices, often by signaling a command by touching a transparent touch sensor overlaid upon a display. Touch sensors are typically constructed of single-layer electrodes formed of a transparent conductive oxide.

SUMMARY

A touch sensor having one or more conducting multilayer electrodes, consistent with the present invention, includes a substrate, a patterned underlayer, and a plurality of multilayer electrodes, each multilayer electrode comprising two transparent or semitransparent conductive layers separated by a transparent or semitransparent intervening layer. The underlayer can function as a vapor and/or diffusion barrier layer, limiting outgassing or other contaminants from the substrate from negatively affecting the first conductive layer. The underlayer can function as a coupling layer promoting adhesion between the substrate layer and the conductive layer. The underlayer can function as a nucleating layer promoting the growth of the conductive layer, and achieving an improved microstructure. By using an underlayer with lower index of refraction than the substrate, the contrast between patterned and unpatterned areas can be decreased.

The intervening layer, situated between two conductive layers, includes electrically conductive pathways between the two conductive layers. Such an electrode construction in some embodiments helps reduce interfacial reflections occurring in a device incorporating the same. The intervening layer also improves the durability of the conductive layers under conditions of flexing and bending. Use of the intervening layer and the conductive pathways between the conductive layers allows for thinner individual conductive layers. The thinner individual conductive layers are more flexible than a single conductive layer of the same combined conductive layer thickness. Flexing a single thick conductive layer would cause cracking under conditions where the two thinner conductive layers would survive intact. The conductive pathways between the two conductive layers also provide redundant electrical pathways such that cracking in one conductive layer will not lead to overall loss of conductivity. In a single thick conductive layer, cracking can lead to open circuits and premature device failure. The intervening layers may be chosen to optimize the overall flexibility of the conducting film.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the present invention relate to touch sensors having multilayer electrodes and a patterned underlayer disposed between the multilayer electrodes and a substrate.

The multilayer electrode / patterned underlayer combination can be used within any sensor or display where, for example, reflections resulting between layers are detrimental to device performance. The substrate may be anything suitable, such as glass or PET. The multilayer electrodes / patterned underlayer combination may also be incorporated into non-transparent touch sensors. The multilayer electrode and underlayer may be patterned to embody bars, triangles, honeycombs, or any other suitable pattern. The pattern of the underlayer may be the same as, similar to, or different than the pattern of the multilayer electrodes. The sensors may be coupled to electronic components that detect changes in inter-electrode, or electrode-to ground capacitance, and thereby determine the coordinates of a touch or near touch.

The underlayer can function as a vapor and/or diffusion barrier layer, limiting outgassing or other contaminants from the substrate or a patterning material on the substrate from negatively affecting the first conductive layer. The underlayer can function as a coupling layer promoting adhesion to a transparent conductive oxide (TCO) layer, such as indium tin oxide (ITO). The underlayer can function as a nucleating layer promoting the growth of the ITO layer and achieving an improved microstructure. By using an underlayer with lower index of refraction than the substrate, the contrast between patterned and unpatterned areas can be decreased.

The multilayer electrodes include two or more conductive layers having a particular refractive index with intervening conductive or insulating layers having a different refractive index and having electrically conductive pathways. The conductive layers and intervening layers are each transparent or semitransparent. The thicknesses of the individual layers and the optical indexes of refraction of the individual layers within the electrode stack are tuned to minimize unwanted Fresnel reflections when these substrates are incorporated within touch sensor. In one embodiment, the conductive layers of the multilayer electrode are symmetric, meaning they have the same thickness. In other embodiments, the conductive layers can have different thicknesses. Conductive layers and intervening layers are described in U.S. patent application Ser. No. 12/639,363, "Touch Sensitive Device with Multilayer Electrode Having Improved Optical and Electrical Performance," filed Dec. 16, 2009, the contents of which are incorporated herein by reference.

Figure 1:
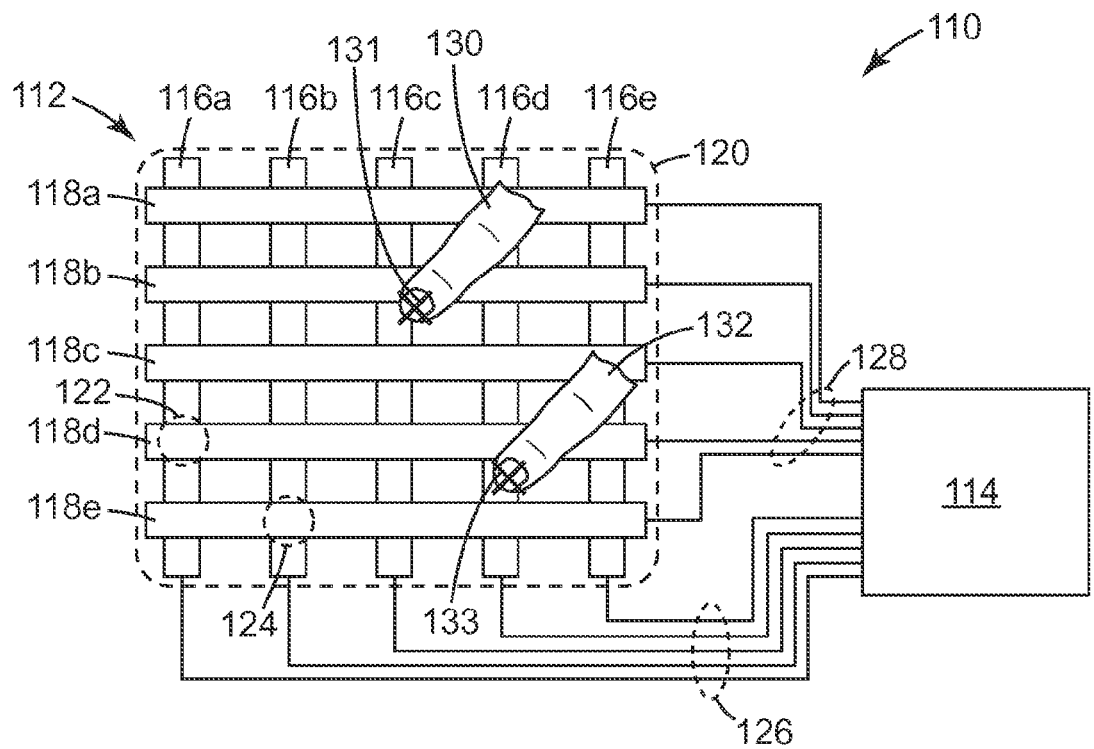
FIG. 1 shows a schematic view of a touch sensitive device and electronics.

In FIG. 1, an exemplary touch device 110 is shown. The device 110 includes a touch panel 112 connected to electronic circuitry, which for simplicity is grouped together into a single schematic box labeled 114 and referred to collectively as a controller. The touch panel 112 is shown for simplicity as having a 5×5 matrix of column electrodes 116a-e and row electrodes 118a-e, but other numbers of electrodes and other matrix sizes can also be used, as well as other electrode patterns, including non-matrix type patterns such as single, non-patterned layers as are used in surface capacitive type touch sensors. The column and row electrodes are multilayer electrodes, as will be further described below, and are disposed upon a substrate (not shown in FIG. 1), with an underlayer separating the electrodes from the substrate. The underlayer is described later in this description. In the embodiment shown in FIG. 1, the underlayer has a pattern corresponding to column (lower) electrodes.

The sensor stack (that is, the substrate layer, the underlayer, and the multilayer electrodes) on panel 112 yields improved electrical and optical properties in some embodiments, compared with some embodiments of the prior art. Panel 112 is typically substantially transparent so that the user is able to view an object, such as the pixilated display of a computer, television, hand-held device, mobile phone, or other peripheral device, through panel 112. Boundary 120 represents the viewing area of panel 112 and also preferably the viewing area of such a display, if used. The multilayer electrodes 116a-e, 118a-e are spatially distributed, from a plan view perspective, over the viewing area 120. For ease of illustration the multilayer electrodes are shown to be wide and obtrusive, but in practice they may be relatively narrow and inconspicuous to the user. Further, they may be designed to have variable widths, for example, an increased width in the form of a diamond- or other-shaped pad in the vicinity of the nodes of the matrix in order to increase the inter-electrode fringe field and thereby increase the effect of a touch on the electrode-to-electrode capacitive coupling. From a depth perspective, the column electrodes may lie in a different plane than the row electrodes (from the perspective of FIG. 1, the column multilayer electrodes 116a-e lie underneath the row multilayer electrodes 118a-e) such that no significant ohmic contact is made between column and row electrodes, and so that the only significant electrical coupling between a given column electrode and a given row electrode is capacitive coupling. The matrix of multilayer electrodes typically lies beneath a cover glass, plastic film, hardcoat, or the like, so that the electrodes are protected from direct physical contact with a user's finger or other touch-related implement. An exposed surface of such a cover glass, film, or the like may be referred to as a touch surface. Configurations of touch sensitive devices other than matrix are also possible using the multilayer electrodes described herein. For example, capacitive buttons comprising two electrodes disposed on a surface to come sufficiently close to one another within the area of the button to have capacitive coupling. These two electrodes (one or both being multilayer electrodes) may be on the same plane, formed in the same layer as one another. Also, rather than the matrix (comprised of a plurality of electrodes), other configurations such as a single sheet-type electrode are also possible. Such sheet-type electrodes are sometimes used in surface capacitive type sensors, and the electrode is an un-patterned coating that substantially covers the entire touch surface. Generally speaking, most known electrode configurations are possible using the multilayer electrodes described herein.

The underlayer that separates the substrate from the electrode-containing layers may be uniformly disposed across the entire substrate layer, or it may be patterned to only be between the substrate layer and either or both of the column electrodes or the row electrodes. In other words, the underlayer may itself have a pattern related to, based upon, or similar to the pattern of the electrode-containing layers.

In exemplary embodiments each of the multilayer electrodes (116a-e, 118a-e) may be composed of two or more conductive layers having a particular refractive index and an intervening conductive layer having a different refractive index and having electrically conductive pathways. In an exemplary embodiments, a patterned underlayer having a pattern corresponding to the pattern of the lower multilayer electrode array is disposed between the lower multilayer electrode array and the substrate.

Other embodiments include a common substrate arrangement, where row multilayer electrodes are disposed on a first side of a substrate, and column multilayer electrodes are disposed on the second side of the substrate. In such an embodiment, a patterned underlayer corresponding to the pattern of, respectively, the row multilayer electrodes or the column multilayer electrodes is disposed on both the first and second sides of the substrate, thereby separating the electrodes on either side from the substrate The capacitive coupling between a given row and column electrode is primarily a function of the geometry of the electrodes in the region where the electrodes are closest together. Such regions correspond to the "nodes" of the electrode matrix, some of which are labeled in FIG. 1. For example, capacitive coupling between column multilayer electrode 116a and row multilayer electrode 118d occurs primarily at node 122, and capacitive coupling between column multilayer electrode 116b and row multilayer electrode 118e occurs primarily at node 124. The 5×5 matrix of FIG. 1 has 25 such nodes, any one of which can be addressed by controller 114 via appropriate selection of one of the control lines 126, which individually couple the respective column multilayer electrodes 116a-e to the controller, and appropriate selection of one of the control lines 128, which individually couple the respective row multilayer electrodes 118a-e to the controller.

In a mutual capacitance-type system, when a finger 130 of a user or other touch implement comes into contact or near-contact with the touch surface of the device 110, as shown at touch location 131, the finger capacitively couples to the electrode matrix. The finger draws charge from the matrix, particularly from those electrodes lying closest to the touch location, and in doing so it changes the coupling capacitance between the electrodes corresponding to the nearest node(s). For example, the touch at touch location 131 lies nearest the node corresponding to multilayer electrodes 116c/118b. Preferably, the controller is configured to rapidly detect the change in capacitance, if any, of all of the nodes of the matrix, and is capable of analyzing the magnitudes of capacitance changes for neighboring nodes so as to accurately determine a touch location lying between nodes by interpolation. Furthermore, the controller 114 advantageously is designed to detect multiple distinct touches applied to different portions of the touch device at the same time, or at overlapping times. Thus, for example, if another finger 132 touches the touch surface of the device 110 at touch location 133 simultaneously with the touch of finger 130, or if the respective touches at least temporally overlap, the controller is preferably capable of detecting the positions 131, 133 of both such touches and providing such locations on a touch output 114a.

Many possible drive and detection routines are possible and known in the art. A capacitance-to-ground type system measures changes in capacitance to ground occurring near nodes of the electrode matrix, rather than capacitance between electrodes.

Figure 2:
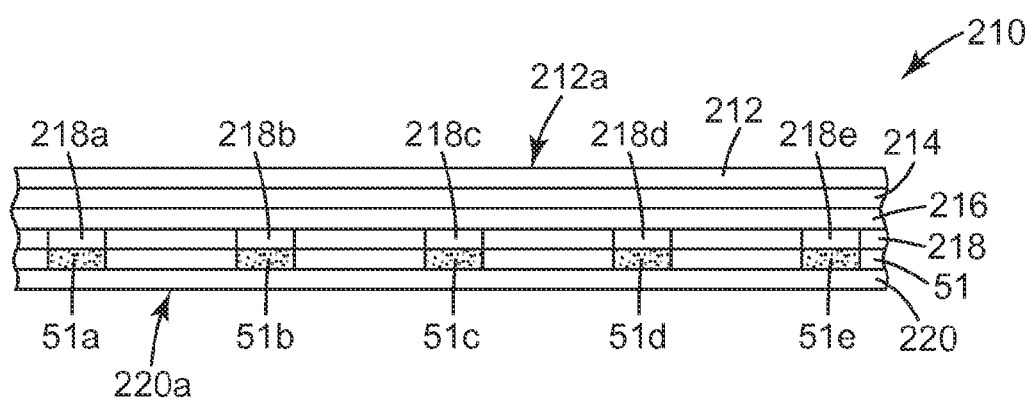
FIG. 2 shows a cross section of a portion of a touch panel used in an exemplary touch sensitive device.

Turning now to FIG. 2, we see there a schematic side view of a portion of a multilayer touch sensor 210 for use in a touch device, such as device 110 of FIG. 1. Touch sensor 210 includes upper layer 212 (which would be the layer closest to the user, and the upper surface 212a of which would define the touch area of a touch sensor), which could be glass, PET, or a durable coating. Upper electrode layer 214 comprises a first set of multilayer electrodes. Dielectric layer 216 separates upper electrode layer from lower electrode layer 218, which also comprises a set of multilayer electrodes 218a-e, which in one embodiment are orthogonal to the first set of electrodes. Dielectric, such as an optically clear adhesive, may fill in spaces between multilayer electrode 218a-e, depending on particulars of construction. In some embodiments, the upper and lower electrodes are not orthogonal to one another. Underlayer 51 is shown patterned in a manner corresponding to the pattern of lower electrode layer 218. It separates the multilayer electrodes of electrode layer 218 from lower layer 220. A similar "overlayer" may be disposed between upper layer 212 and electrodes of upper electrode layer 214, but it is not shown in FIG. 2. Lower layer 220 in this FIG. 2 is the substrate layer, and may, like the upper layer, be glass, PET, or other material. The exposed surface 212a of upper layer 212, or the exposed surface 220a of lower layer 220, may be or include the touch surface of the touch sensor 210. This is a simplified view of the stack that makes up the touch sensor; more or fewer layers and other intervening layers are possible.

Figure 3:
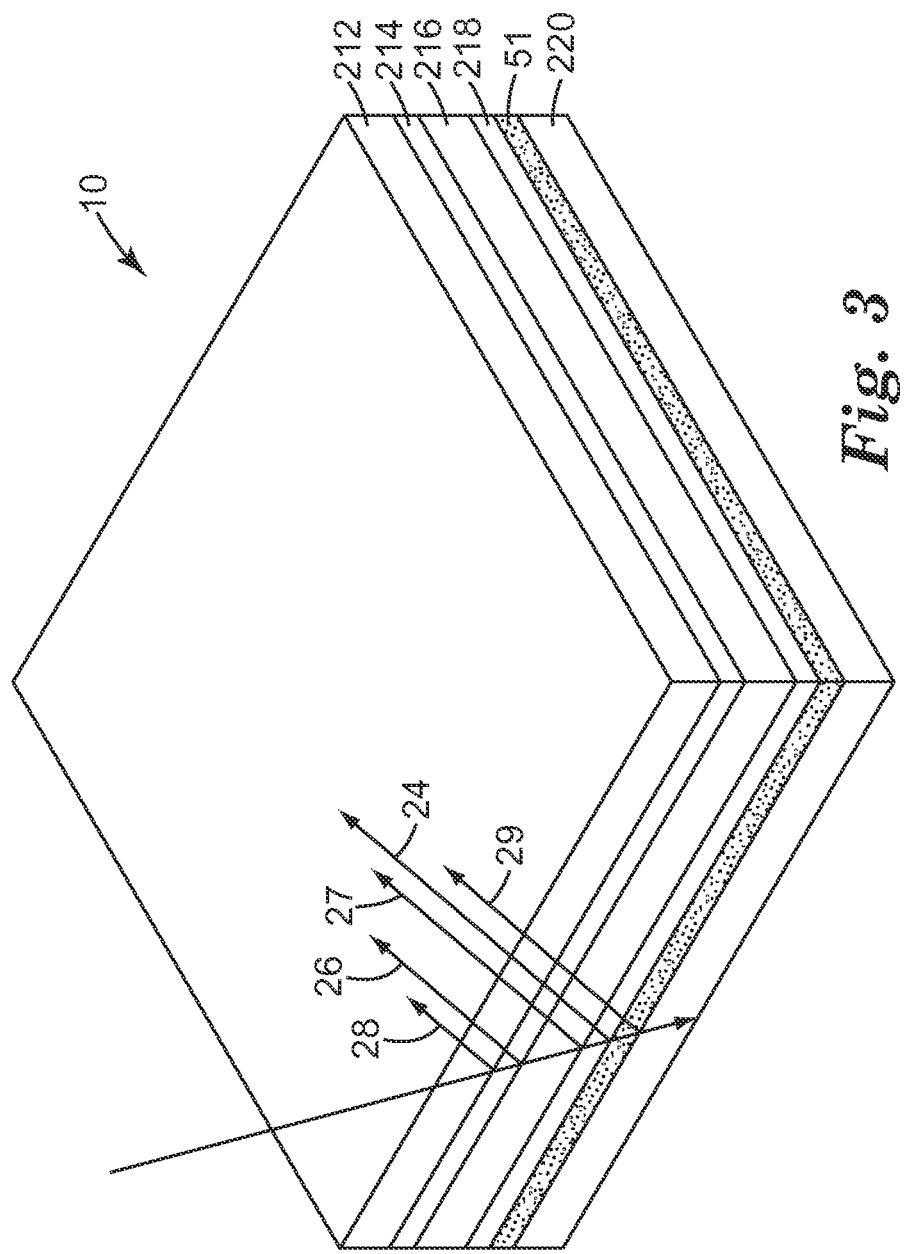
FIG. 3 shows a cross section of a portion of a touch panel used in an exemplary touch sensitive device.

Turning now to FIG. 3, we see sensor stack 10, a schematic three dimensional view of a portion of a multilayer touch sensor 210 for use in a touch device, such as device 110 of FIG. 1. The cross section of FIG. 3 corresponds to that which would be seen at, for example, node 122 or 124 of FIG. 1, and includes upper layer 212, electrode layer 214, dielectric layer 216, electrode layer 218, underlayer 51, and lower layer 220. The light reflected by an electrode includes the planar reflection and unwanted Fresnel reflections at each layer interface due to refractive index mismatches, represented by reflections 24, 26, 27, 28, and 29. Fresnel reflections are typically broadband and hence degrade the color saturation of the display. Light reflected by an electrode includes scattering and the interfacial Fresnel reflections. These reflections degrade the black level of an underlying display and hence the contrast ratio. They also make the electrodes within the sensor more noticeable to a user especially when the display is off or set to a single color in a region greater than an electrode.

The magnitude of the Fresnel reflection depends on the ratio of refractive indices at the layer interface. At normal incidence it is determined by the following equation:

$$R = \left(\frac{n-1}{n+1}\right)^2;$$

$$n = \frac{n_2}{n_1}$$

where n is the relative index of the two media with refractive indices n2, n1. Fresnel reflections are strongest at interfaces with the highest relative index. For example, when approximate refractive indices of the various layers of sensor stack 10 shown in FIG. 3 are n=2.0 for the electrodes and n=1.65 for the substrate, the highest index step would occur, in the absence of an underlayer, at the interfaces between the ITO electrode layer and the polyethylene terephthalate (PET) substrate layer. The underlayer thus separates these two layers which may improve optical qualities associated with the sensor. Note that sensor stack 10 includes an ITO/PET interface between upper layer 212 and electrode layer 214. The underlayer, described herein, could also be used as an overlayer, disposed between upper layer 212 and electrode layer 214.

The multilayer electrode design of embodiments of the present invention yields both good optical and electrical performance. The intervening dielectric layer in the multilayer electrode design is a transparent or semitransparent layer having electrically conductive pathways that enable electrical contact between the two conductive layers. The pathways may form naturally by controlling the thickness and deposition conditions of the intervening layer. The chemical and physical properties of the first conductive layer nearest the substrate may also be adjusted to enable formation of these pathways by changing the wetting properties of the intervening layer such that the intervening layer is discontinuous to allow electrical contact between the adjacent layers. Alternatively, the pathways could be created using techniques such as laser ablation, ion bombardment or wet/dry etching.

The intervening layer may be deposited using vapor deposition techniques such as sputtering, e-beam, and thermal evaporation. The intervening layer can include polymers, including copolymers, such as polyacrylates, polymethacrylates, polyolefins, polyepoxides, polyethers, and the like, and inorganic materials such as metal oxides, nitrides, carbides, and mixtures thereof. Preferred non conductive intervening layers include polyacrylates and silicon oxides. The intervening layer may also be formed using solution coating. An ultrabarrier film process, in which a monomer is evaporated onto the substrate and cured in-situ, may also be used. Ultrabarrier films include multilayer films made, for example, by vacuum deposition of two inorganic dielectric materials sequentially in a multitude of layers on a glass or other suitable substrate, or alternating layers of inorganic materials and organic polymers, as described in U.S. Pat. Nos. 5,440,446; 5,877,895; and 6,010,751, all of which are incorporated herein by reference as if fully set forth.

Figure 4:
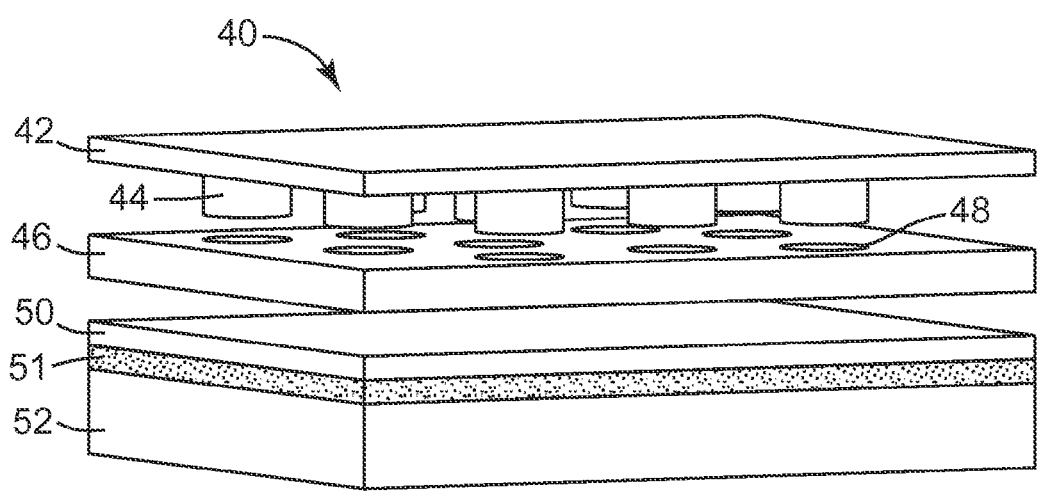
FIG. 4 is a diagram of a multilayer electrode having an intervening layer with conductive paths and an underlayer.

One embodiment is shown as a stack 40 of FIG. 4. The multilayer electrode includes two high index conductive layers 42 and 50 of transparent conductive oxide (TCO) or semitransparent conductive oxide separated by a lower index transparent or semitransparent layer 46 having electrically conductive pathways comprising conductive links 44 extending through apertures 48 in transparent layer 46 to connect the electrodes 42 and 50. A substrate 52 provides support for the electrode. The layers are drawn apart to illustrate the concept.

Underlayer 51 provides, in one embodiment, an optical matching layer between neighboring layers of the sensor stack. Underlayer 51 may be deposited using vapor deposition techniques such as sputtering, e-beam, and thermal evaporation. The underlayer can include polymers, including copolymers, such as polyacrylates, polymethacrylates, polyolefins, polyepoxides, polyethers, and the like, and inorganic materials such as metal oxides, nitrides, carbides, and mixtures thereof. Preferred non conductive intervening layers include polyacrylates and silicon oxides, and in particular SiAlOx or SiOx. The underlayer may also be formed using solution coating. If the underlayer is patterned then it may be conductive. The ideal index for the underlayer depends on the index of the substrate end the effective index of neighboring layers. Other suitable underlayers include barrier films and ultrabarrier films. An example of a barrier film is described in U.S. Pat. No. 7,468,211, which is incorporated herein by reference as if fully set forth. An ultrabarrier film process, in which a monomer is evaporated onto the substrate and cured in-situ, may also be used. Ultrabarrier films include multilayer films made, for example, by vacuum deposition of two inorganic dielectric materials sequentially in a multitude of layers on a glass or other suitable substrate, or alternating layers of inorganic materials and organic polymers, as described in U.S. Pat. Nos. 5,440,446; 5,877,895; and 6,010,751, all of which were earlier incorporated herein by reference as if fully set forth.

Patterning the underlayer in one embodiment may be accomplished in several ways. For example, a photoresist may be patterned on an underlayer continuously disposed upon a substrate, and the underlayer subsequently etched, and the photoresist then stripped, revealing a pattern of underlayer in areas where the etchant has not bade contact due to the presence of the photoresist. In another embodiment, a water soluble ink, such as that described in U.S. Pat. No. 4,714,631, "Rapidly Removable Undercoating for Vacuum Deposition of Patterned Layers onto Substrates," the contents of which are incorporated by reference in its entirety, may be used as a liftoff mask. In such a method, the liftoff mask is applied before the underlayer, in areas of the substrate where there is eventually to be devoid of underlayer. The underlayer may then be uniformily applied across the substrate using techniques mentioned above or those known in the art. Water may then be used to remove areas of the stack that include the liftoff mask, leaving patterned underlayer in the areas not so removed. It is also possible to pattern both the conductive multilayer electrode layers and the underlayer using the same liftoff mask, thereby achieving the same pattern for both layers. In such a process, the underlayer is applied to the liftoff mask as mentioned earlier, then a continuous layer of multilayer electrode material is applied to the underlayer, then the stack washed in a water bath.

Similar techniques may be applied to embodiments where multilayer electrodes exist on different sides of a common substrate.

In embodiments referred to earlier having both an underlayer and an overlayer, the overlayer may have a construction the same as set forth herein for the underlayer. In some embodiments, the underlayer and the overlayer are of differing constructions.

Figure 5:
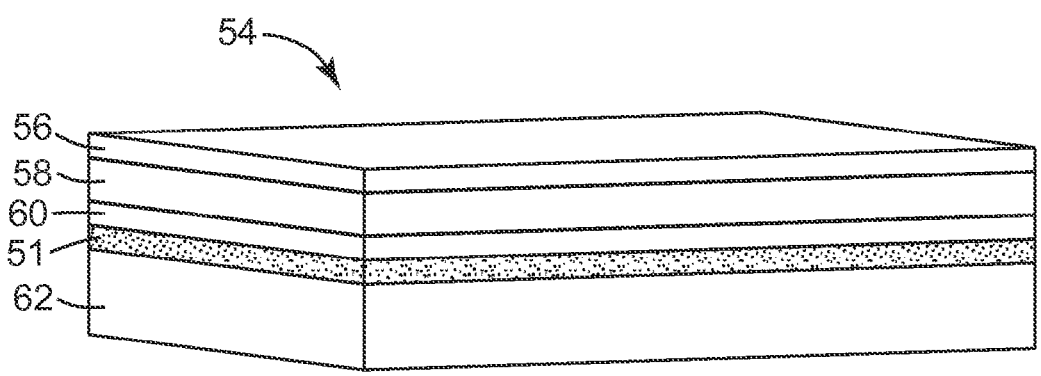
FIG. 5 is a diagram of a multilayer electrode having an intervening conductive layer and an underlayer.

In another embodiment, the intervening layer is a transparent or semitransparent conductor with a lower refractive index than the conductive layers on either side, as shown in stack 54 of FIG. 5. The same underlayer 51 is seen in FIG. 5, as described with respect to FIG. 4. In the multilayer electrode included in stack 54, the intervening conductive layer 58 may provide continuous electrically conductive pathways between the two adjacent conductive layers 56 and 60 of TCO or semitransparent conductive oxide. A substrate 62 provides support for the multilayer electrode. The intervening layer 58 may comprise a solution coated or electrodeposited conductive polymer. It can also be a vapor deposited transparent conductor. Conducting polymers include the following exemplary materials: polyaniline; polypyrrole; polythiophene; and PEDOT/PSS (poly(3,4-ethylenedioxythiophene)/polystyrenesulfonic acid). The combined thickness of the conductive layers is constrained by the sheet resistance requirements while the thicknesses of the individual layers are optimized for the desired optical properties.

Figure 6:
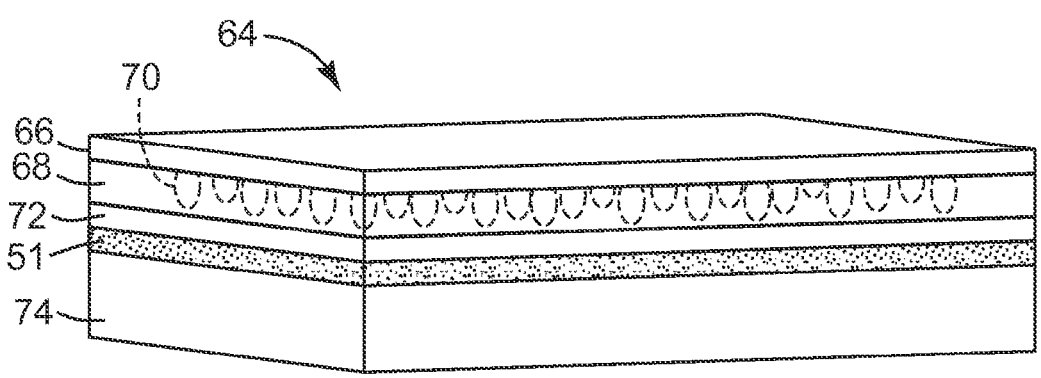
FIG. 6 is a diagram of a multilayer electrode having an intervening layer with conductive particles dispersed in a binder and an underlayer.

In yet another embodiment, the intervening layer comprises conductive particles dispersed in a binder, as shown in stack 64 of FIG. 6. The conductive particles 70 in binder 68 provide conductive pathways between the conductive layers 66 and 72 of TCO or semitransparent conductive oxide, thus forming the multilayer electrode. The same underlayer 51 as described earlier is present in this embodiment. A substrate 74 provides support for the stack. The binder can be conductive or insulating. The conductive particles can be organic, inorganic, or metallic. Conductive particles also include metal coated particles. The refractive index of the intervening layer can be adjusted by varying the volume fractions of the binder and conductive particles.

The matrix and embedded conducting nanoparticles for the multilayer electrodes can include the following. The matrix can include any transparent or semitransparent (conductive or insulating) polymer (e.g., acrylates, methacrylates, or the conducting polymers listed above), or a transparent or semitransparent inorganic material either conductive (such as the TCOs listed above) or insulating ($SiO_2$, silicon nitride ($Si_xN_y$), Zinc Oxide ($Z_nO$), aluminum oxide ($Al_2O_3$), or magnesium fluoride ($MgF_2$)). The conducting nanoparticles can include conducting polymers such as those listed above, metals (e.g., silver, gold, nickel, chrome), or metal coated particles. If the matrix is conductive then the nanoparticles can be insulating, in particular they can be nanoparticles of the insulating materials listed above (e.g., $SiO_2$, silicon nitride, zinc oxide, or other insulating materials.)

Substrates layers for devices using the multilayer electrodes can include any type of substrate material for use in making a display or electronic device. The substrate can be rigid, for example by using glass or other materials. The substrate can also be curved or flexible, for example by using plastics or other materials. Substrates can be made using the following exemplary materials: glass; polyethylene terephthalate (PET); polyethylene napthalate (PEN); polycarbonate (PC); polyetheretherketone (PEEK); polyethersulphone (PES); polyarylate (PAR); polyimide (PI); poly(methyl methacrylate) (PMMA); polycyclic olefin (PCO); cellulose triacetate (TAC); and polyurethane (PU).

Other suitable materials for the substrate include chlorotrifluoroethylene-vinylidene fluoride copolymer (CTFE/VDF), ethylene-chlorotrifluoroethylene copolymer (ECTFE), ethylene-tetrafluoroethylene copolymer (ETFE), fluorinated ethylene-propylene copolymer (FEP), polychlorotrifluoroethylene (PCTFE), perfluoroalkyl-tetrafluoroethylene copolymer (PFA), polytetrafluoroethyloene (PTFE), polyvinylidene fluoride (PVDF), polyvinyl fluoride (PVF), tetrafluoroethylene-hexafluoropropylene copolymer (TFE/HFP), tetrafluoroethylene-hexafluoropropylene-vinylidene fluoride terpolymer (THV), polychlorotrifluoroethylene (PCTFE), hexafluoropropylene-vinylidene fluoride copolymer (HFP/VDF), tetrafluoroethylene-propylene copolymer (TFE/P), and tetrafluoroethylene-perfluoromethylether copolymers (TFE/PFMe).

TCOs for the multilayer electrodes include the following exemplary materials: ITO; tin oxides; cadmium oxides ($CdSn_2O_4$, $CdGa_2O_4$, $CdIn_2O_4$, $CdSb_2O_6$, $CdGeO_4$); indium oxides ($In_2O_3$, Ga, $GaInO_3$ (Sn, Ge), $(GaIn)_2O_3$); zinc oxides (ZnO(Al), ZnO(Ga), $ZnSnO_3$, $Zn_2SnO_4$, $Zn_2In_2O_5$, $Zn_3In_2O_6$); and magnesium oxides ($MgIn_2O_4$, $MgIn_2O_4$—$Zn_2In_2O_5$). In addition, TCOs need not be compounds and mixtures of these oxides, for example $In_2O_3$ and ZnO; $SnO_2$ and ZnO; with or without dopants.

Figure 7:
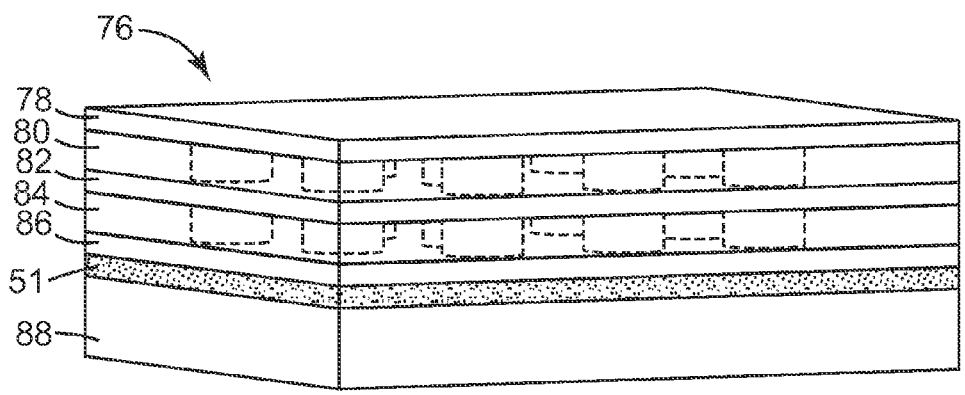
FIG. 7 is a diagram of a multilayer electrode having multiple intervening layers and an underlayer.
Figure 8A:
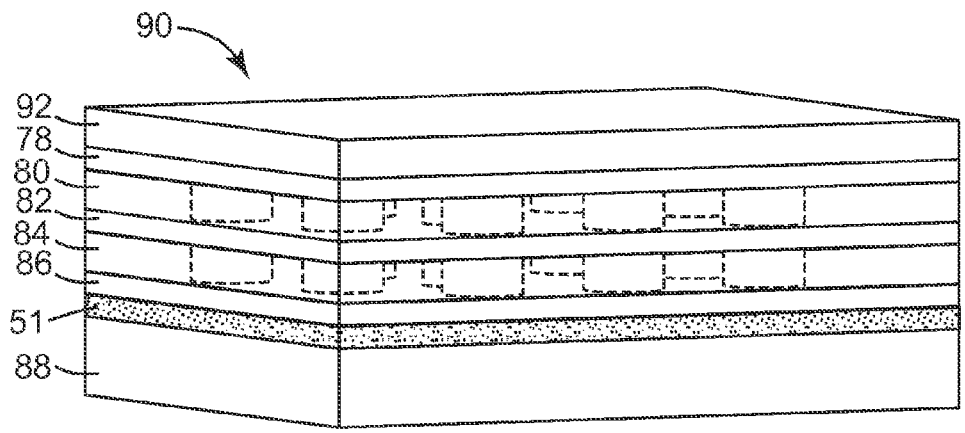
FIG. 8A is a diagram of a multilayer electrode having multiple intervening layers and an underlayer.

While the embodiments described above include two transparent or semitransparent conductive layers separated by an intervening layer, additional transparent or semitransparent conductive and intervening layers may be added depending on the desired optical and electrical properties, as shown in FIGS. 7 and 8A. Stacks 76 and 90 shown in FIGS. 7 and 8A include a substrate 88 and underlayer 51 and the following layers functioning as a single electrode: multiple transparent or semitransparent conductive layers 78, 82, and 86; intervening transparent or semitransparent layers 80 and 84 between the conductive layers. Additional layers of conductive layers and intervening layers can be added as well such that the electrode has any number of layers optimized or tuned for a particular device. It is also possible to incorporate the sensor onto the display stack, wherein the layer in contact with the display stack could be conductive or insulating as needed, as shown with respect to conductive layer 78 shown in FIG. 7 or an insulating layer 92 (such as an optically clear adhesive) shown in FIG. 8A. Furthermore, the multilayer electrode can be "tuned" to different optical properties for desired end uses. For example, the materials for the intervening layer, and the thicknesses of the layers, can be varied for a desired use or property, such as reducing reflection when a display is in the off state.

Figure 8B:
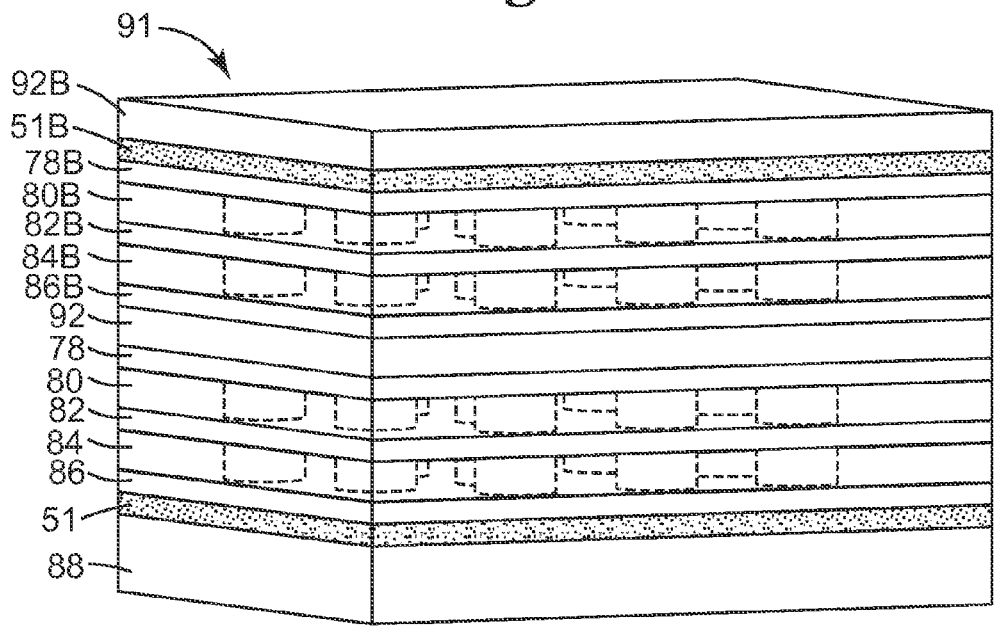
FIG. 8B is a diagram of a cross-section of a matrix-type touch screen at a node, showing an X-axis multilayer electrode having multiple intervening layers and an underlayer, and a Y-axis multilayer electrode having multiple intervening layers and an underlayer.

Whereas FIGS. 7 and 8A show a sensor stack with underlayer 51 and a multilayer electrode having 3 conductive layers (and 2 intervening layers), FIG. 8B shows stack 91 from a cross section of a node on a matrix-type touch screen having X- and Y-electrodes, each electrode having a 3 conductive layer stack. Conductive layers 78, 82, and 86, in conjunction with intervening layers 80 and 84 comprise, for example, an X-axis electrode. Insulating layer 92, which could be a suitable optically clear adhesive, or a layer of PET, separates the X-axis electrode from the Y-axis electrode, which is comprised of conducting layers 78b, 82b, and 86b in conjunction with intervening layers 80b and 84b. While this construction is a 3 conductive layer per electrode, other arrangements are possible, such as 3 conductive layers for a given electrode, and greater than or less than 3 conductive layers for another electrode. Though not shown in FIG. 8B, an underlayer, or more accurately an overlayer, could also exist between insulating layer 92B and conductive layer 78B.

Figure 9A:
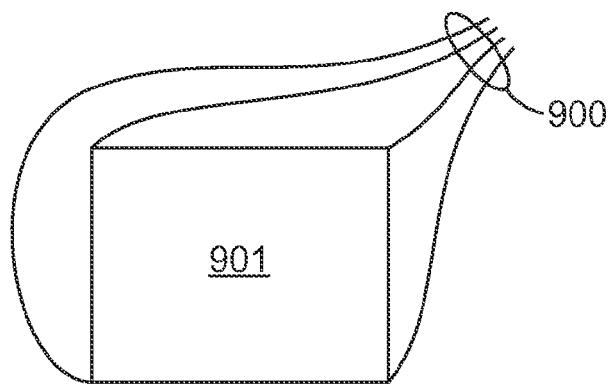
FIG. 9A-C show various patterns the which the multilayer electrodes and underlayer may be embodied; and, FIG. 10 shows a plan view of a multilayer electrode and underlayer pattern for a matrix-type touch screen prototype.
Figure 9B:
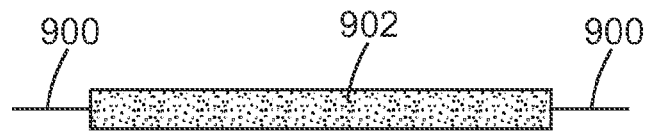
Figure 9C:
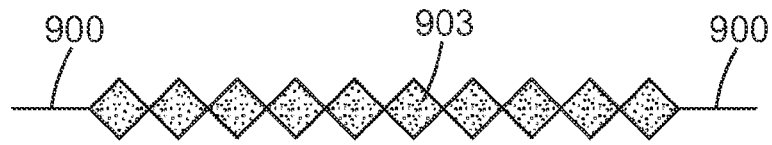
Figure 10:
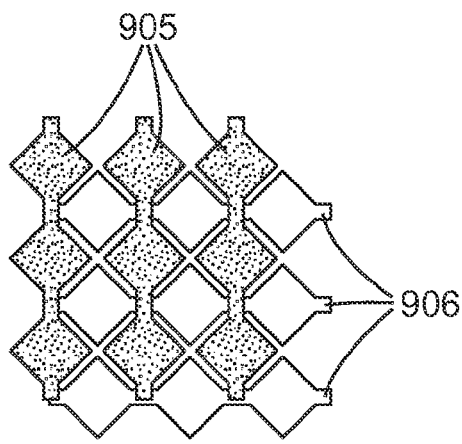

FIGS. 9a through 9c show various configurations of a multilayer electrode in combination with underlayers. FIG. 9a shows a sheet-type, un-patterned multilayer electrode 901, with wiring leads 900 connected to each corner. FIG. 9b shows a multilayer electrode 902 configured as a bar; FIG. 9c shows multilayer electrode 903 configured as repeating diamond shapes. Underlayers 51 for each of these embodiments may be patterned in the shapes shown in FIGS. 9a and 9b, or they may be patterned differently. FIG. 10 is a diagram of a sensor having row multi-layer electrodes 906 and column multi-layer electrodes 905. Underlayer may be disposed only in areas between electrodes 906 and 905 and a substrate (not shown in FIG. 10), or the underlayer may be continuous. Additionally, underlayer may be patterned similarly to both or either of the electrodes 906 and 905.

From the viewpoint of optical properties, there are two main objectives of an underlayer. The first objective is to make the reflectance from the interfaces as low as possible, in a practical way. The second objective is to match the reflectances from the patterned multi-layer electrodes, for example 905 and 906 in FIG. 10, and the substrate areas (not shown in FIG. 10), to minimize the visibility of the electrodes to a user or viewer.

For the embodiments discussed previously where the underlayer is a single layer, a low index undercoat is preferred for the first objective. Ideally, if the medium adjacent to the undercoat is air, the index of the underlayer 51 is equal to the square root of the substrate index of refraction so as to best antireflect the areas where the multilayer electrode is removed when patterned. When this low index cannot be obtained with a suitable material, a higher index which is lower than the substrate index can be used, often at reduced optical performance. If the medium adjacent to the underlayer is not air, such as a suitable optically clear adhesive, or a layer of PET, the ideal underlayer index is intermediate between the index of this medium and the index of the substrate. The thickness of the underlayer may be quite thin, less than an optimal quarter wave optical thickness or massive, i.e., much thicker than a quarter wave, and still provide an optical benefit. In areas where the underlayer is under the multilayer electrode the thicknesses in the stack could be adjusted to accommodate for the undercoat, as is known to those skilled in the arts.

For the second objective, to minimize the optical contrast, i.e., the difference in reflectances, between the areas with and without the multi-layer electrodes, the index of the underlayer should ideally equal the effective index of the stack. For this objective, the underlayer index could be as high as the substrate index. The index (and thickness) of the underlayer, therefore, may be chosen as a compromise between the two objectives.

Figure 11:
FIG. 11 is a diagram of an underlayer comprised of a plurality of sub-layers.

FIG. 11 is a diagram of an underlayer layer comprised of a plurality of sub-layers. When two or more sub-layers (FIG. 11) are used for the underlayer, the compromise between the two objectives can sometimes be better met than with a single layer. For example, if a two sub-layer underlayer includes a high index sub-layer, greater than the index of refraction of the substrate, followed by a low index sub-layer, less than or at most equal to the index of refraction of the substrate, then this two sub-layer underlayer can achieve, in some embodiments, a lower reflectance over a wider wavelength range, than with a practical low index single underlayer of, for example, $SiO_2$ or $SiAlO_x$. This then allows a lower reflectance also to be used in areas with the multilayer electrode stack, without causing an undesirable higher contrast between these areas with and without the multilayer electrode. The high index layer can be a TCO or can be a dielectric such as $Si_xN_y$, $AlN_z$ or many of the high index dielectrics used for transparent optical coatings, such as metal oxides titanium oxide, zirconium oxide, niobium oxide, or metal oxynitrides, as known to one skilled in the arts.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A method of making a sensor component for use in a contact-sensitive device, the method comprising:

patterning a substrate with a lift-off mask to produce patterned substrate;

applying an underlayer layer to the patterned substrate;

applying a multilayer electrode layer to the underlayer layer, wherein the multilayer electrode layer comprises a first transparent or semitransparent conductive layer, a second transparent or semitransparent conductive layer, and a transparent or semitransparent intervening layer located between the first and second conductive layers, the intervening layer including electrically conductive pathways between the first and second conductive layers; and removing the liftoff mask.

2. The method of claim 1, wherein the lift-off mask comprises a water-soluble ink.

3. The method of claim 2, wherein removing comprises exposing the patterned substrate to a water-based solution.

4. The method of claim 1, wherein the substrate is substantially transparent.

5. The method of claim 1, wherein the underlayer has an index of refraction different than the substrate layer.

6. The method of claim 5, wherein the underlayer has an index of refraction different than the multilayer electrode layer.

7. The method of claim 1, wherein removing the liftoff mask comprises removing the layers above the liftoff mask.

8. The method of claim 1, wherein patterning comprises a negative of a honeycomb pattern.

9. The method of claim 1, wherein patterning comprises a negative of a diamond pattern.

10. The method of claim 1, wherein the first and second conductive layers each comprise a transparent or semitransparent conductive oxide.

11. The method of claim 10, wherein the electrically conductive pathways comprise conductive links extending through apertures between the first and second conductive layers.

12. The method of claim 1, wherein applying an underlayer comprises applying a first sub-layer, then applying a second sub-layer, the first and second sub-layers having indexes of refraction different than one another.

13. The method of claim 12, wherein applying an underlayer further comprises applying a plurality of additional sub-layers.

* * * * *